United States Patent
Ernst et al.

[15] 3,678,708
[45] July 25, 1972

[54] FLEXIBLE COUPLINGS

[72] Inventors: Lothar Ernst, Unna; Werner Rüggen, Holzwickede, both of Germany

[73] Assignee: Maschinenfabrik Stromag G.m.b.H., Unna, Germany

[22] Filed: April 22, 1971

[21] Appl. No.: 117,678

[30] Foreign Application Priority Data

April 24, 1970 Germany...................P 20 20 179.0

[52] U.S. Cl. ....................................64/11 R, 64/14, 74/574
[51] Int. Cl................................................................F16d 3/58
[58] Field of Search..................64/11 R, 14, 27 NM; 74/574

[56] References Cited

UNITED STATES PATENTS

| 1,582,284 | 4/1926 | Leipert | 64/11 |
| 2,716,904 | 9/1955 | Schuldt | 74/574 |
| 3,443,454 | 5/1969 | Hall | 74/574 |

*Primary Examiner*—Kenneth W. Sprague
*Attorney*—Erwin Salzer

[57] ABSTRACT

A flexible coupling including a first coupling member, a second coupling member and a flexible torque-transmitting member for transmitting torques from one of the coupling members to the other. The flexible torque-transmitting member is provided with impeller-like surface elements to establish a flow of ambient air cooling the coupling when rotating.

25 Claims, 22 Drawing Figures

Patented July 25, 1972

INVENTORS
Lothar ERNST
Werner RÜGGEN

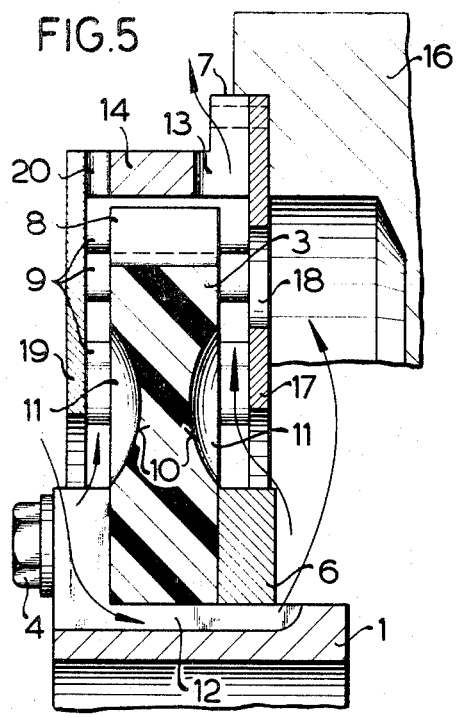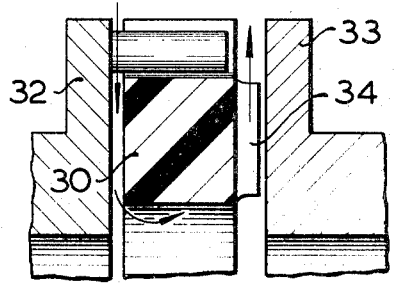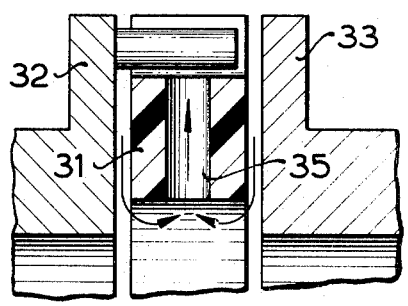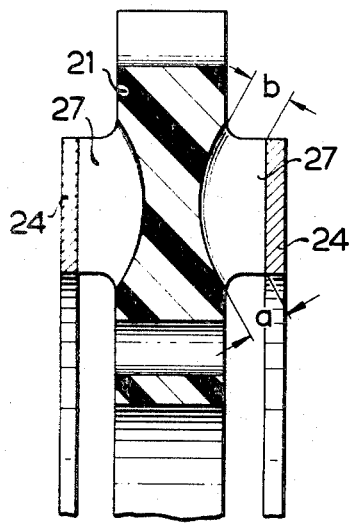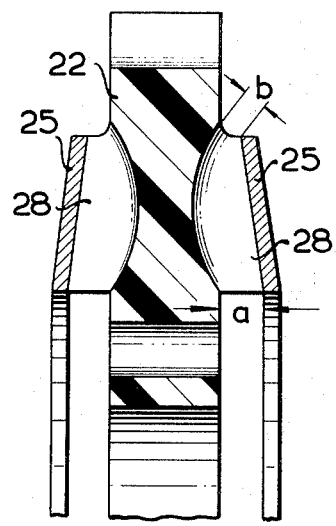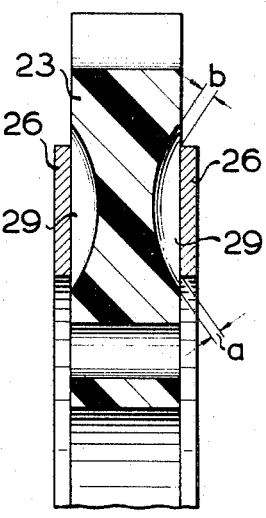

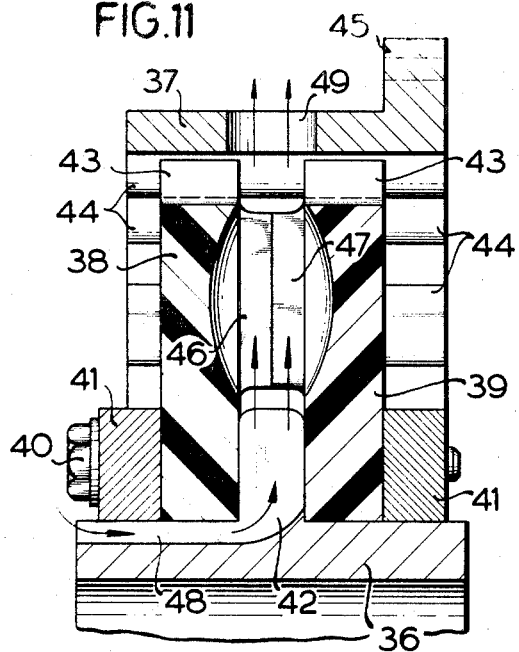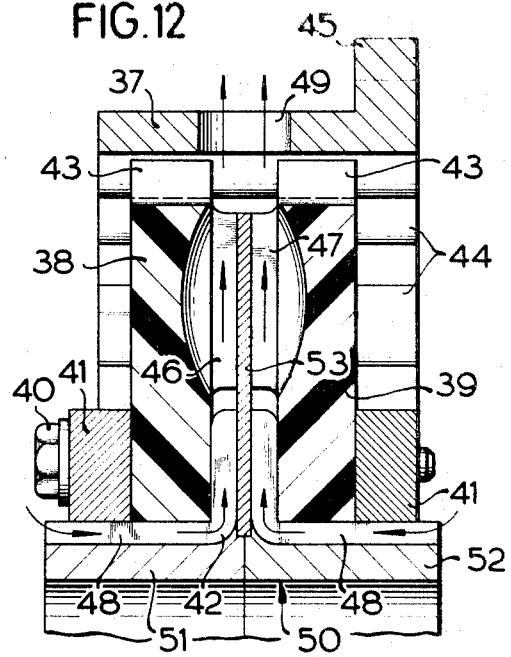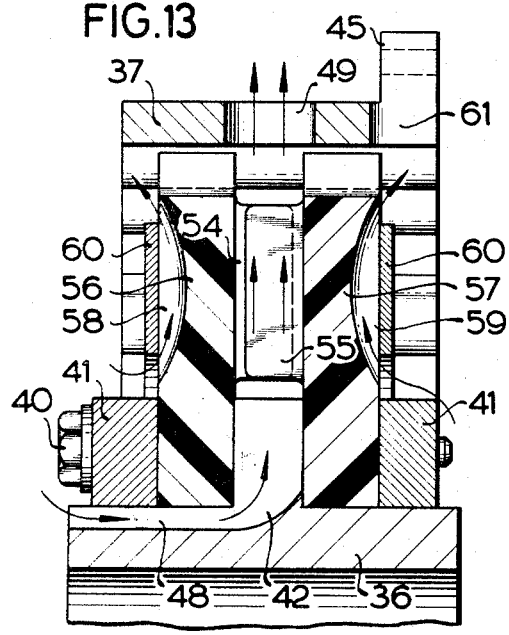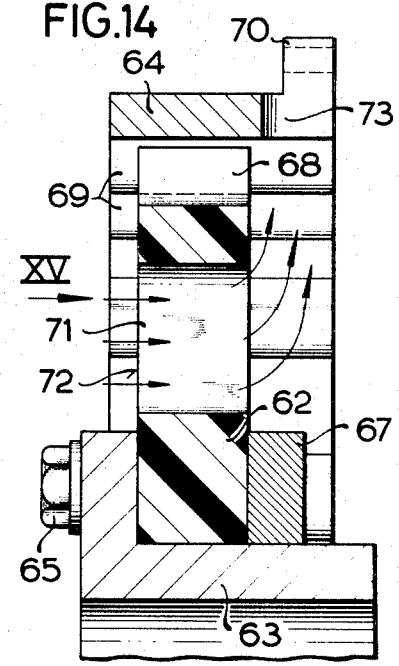

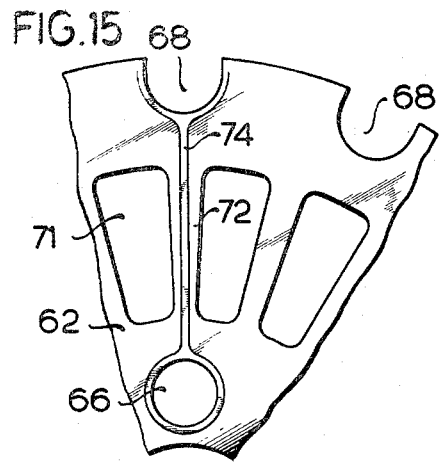
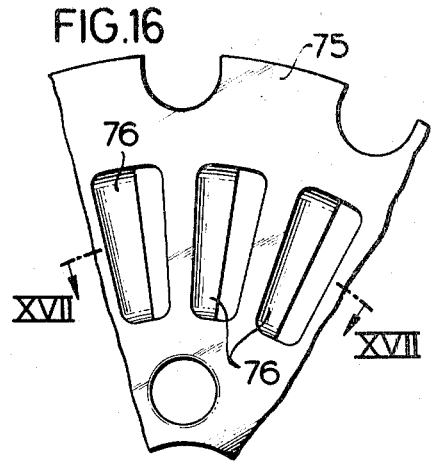
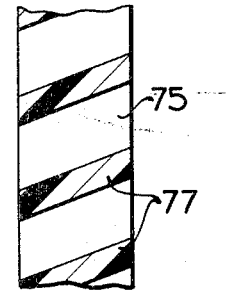
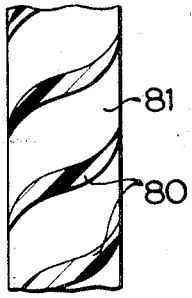
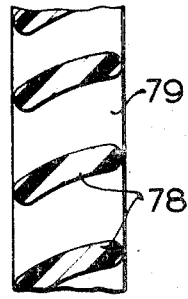
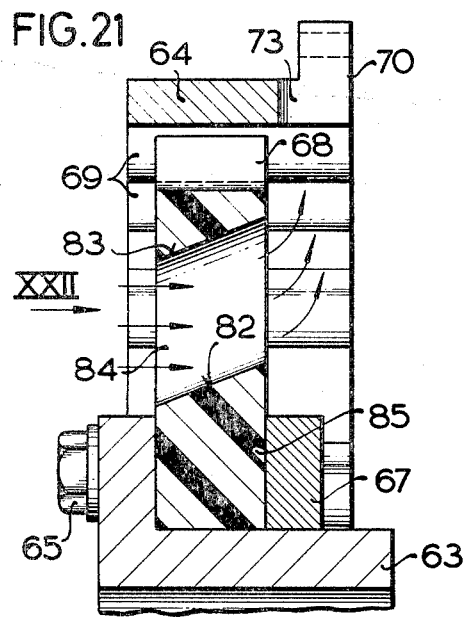
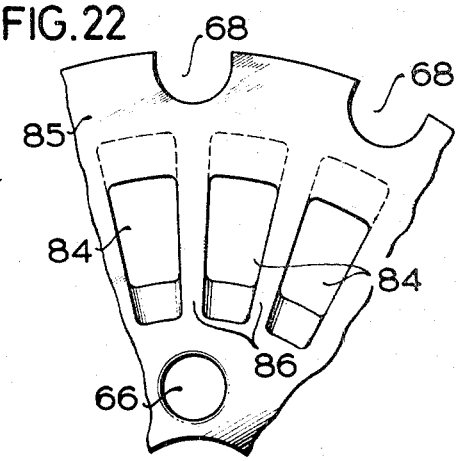

3,678,708

FLEXIBLE COUPLINGS

BACKGROUND OF THE INVENTION

Flexible couplings which include a first rotatable coupling member, a second rotatable coupling member and a flexible torque-transmitting member for transmitting torques for one of the coupling members to the other are often subjected to severe thermal stresses. One such instance is where a flexible coupling of the aforementioned description is applied for coupling a piston motor, e.g. an internal combustion engine, and a flywheel. The flexible coupling is heated by heat conduction and heat radiation from the motor, or internal combustion engine, as well as by heat generated in the flexible torque-transmitting member thereof. The latter component of the heating effect to which the torque-transmitting member is subjected is particularly significant at a critical number of revolutions of the flexible coupling. These various heating effects are detrimental to the flexible torque-transmitting member which is generally made of an elastomer, such as rubber. Due to excessive heating flexible torque-transmitting members of flexible couplings age relatively rapidly, i.e. excessive heating shortens the useful life thereof, and tends to decrease their mechanical strength. There are numerous applications of flexible couplings other than those involving internal combustion engines where the torque-transmitting member of the coupling is subjected to premature ageing on account of excessive thermal stresses imposed upon it. One such instance is processes performed at elevated temperatures and involving machinery allowing the flow of heat from any source of heat to a flexible coupling, e.g. by heat conduction through steel structures.

The principal object of the invention is to provide flexible couplings including a flexible torque-transmitting member that are not subject to excessive heating, and consequent ageing and deterioration.

SUMMARY OF THE INVENTION

A flexible coupling embodying this invention includes a first coupling member, a second coupling member, and a torque-transmitting member affixed on one side thereof to said first coupling member and affixed on the other side thereof to said second coupling member to transmit torques from said first coupling member to said second coupling member. Said flexible torque-transmitting member includes impeller-like surface elements converting rotary motions of said impeller-like surface elements into a flow of ambient air along the surface of said torque-transmitting member in order to cool said torque-transmitting member.

BRIEF DESCRIPTION OF THE DRAWINGS

FIG. 5 is a section of the same nature as shown in FIG. 4 and refers to a modification of the structure shown in FIG. 4;

FIGS. 6–8 are axial sections of three modifications of a torque-transmitting member embodying this invention;

FIGS. 9 and 10 are axial sections of radially outer portions of flexible couplings embodying the present invention;

FIG. 11 is an axial section of a portion of a flexible coupling embodying the present invention including two flexible torque-transmitting members rather than but one such member;

FIGS. 12 and 13 are axial sections of portions of flexible couplings embodying this invention and including two flexible torque-transmitting members rather than but one such member;

FIG. 14 is an axial section of a portion of a flexible coupling embodying the present invention wherein the surface elements of the flexible torque-transmitting member operating as impellers establish a substantially axial flow of cooling air;

FIG. 15 is a side elevation of a portion of the flexible torque-transmitting member of the structure of FIG. 14 seen in the direction of the arrow XV of FIG. 14;

FIG. 16 shows a modification of the structure of FIG. 14 in the same way as FIG. 15;

FIG. 17 is a section along XVII—XVII of FIG. 16;

FIGS. 18–20 show modifications of the flexible torque-transmitting member of FIGS. 14 and 16 in the same way as FIG. 17;

FIG. 21 shows a modification of the structure of FIGS. 14 and 15 in the same fashion as FIG. 14; and FIG. 22 shows a portion of the flexible torque-transmitting member of the structure of FIG. 21 seen in the direction of the arrow XXII of FIG. 21.

DESCRIPTION OF PREFERRED EMBODIMENTS

Figure 1:
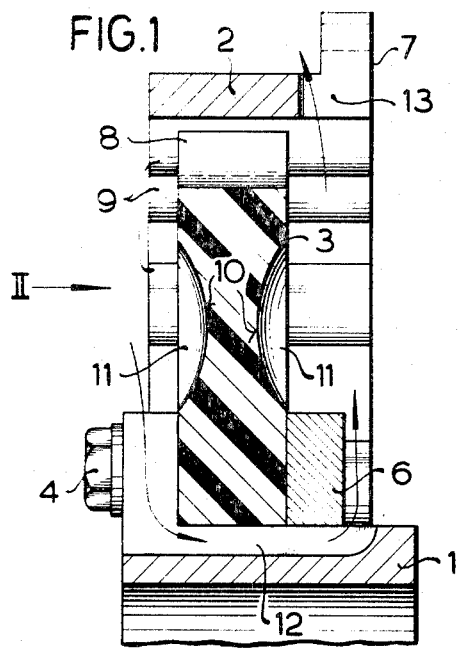
FIG. 1 is an axial section of a portion of a flexible coupling embodying the present invention adapted to establish substantially radial currents of ambient air for cooling the flexible torque-transmitting member thereof.

In most of the figures such as in FIGS. 1, 2, 4 and 5 one half of a coupling has been shown and the other half has been deleted since it is identical to the half of the coupling which has been illustrated. The coupling of FIGS. 1 and 2 includes a pair of co-axial, substantially annular rotatable coupling members 1 and 2. Reference numeral 3 has been applied to indicate a flexible torque-transmitting member for transmitting torques from one of the coupling members to the other. The torque-transmitting member 3 is of vulcanized rubber, or a like flexible elastomer. The diameters of coupling members 1 and 2 are different. The coupling member 1 having a relatively small diameter may be keyed to a shaft, and the coupling member 2 having a relatively large diameter may be affixed to a flywheel, e.g. by means of the radially outwardly projecting flange 7 thereof. The flexible coupling member 3 is provided with axially extending apertures or bores 5, as clearly shown in FIG. 2. Screw-threaded studs 4 project through lugs formed by coupling member 1 and through the holes or apertures 5 in flexible torque-transmitting member 3 into an annular clamping member 6, and thus firmly secure one side of torque-transmitting member 3 to coupling member 1. The outer periphery of torque-transmitting member 3 is provided with axially extending grooves or recesses 8 (FIG. 2) which are engaged by a system of teeth 9 projecting radially inwardly from the radially inner surface of coupling member 2. As a result, the radially outer side of torque-transmitting member 3 is firmly affixed to the radially outer annular coupling member 2.

The torque-transmitting member 3 is substantially in the shape of a circular disc and is provided on both end surfaces thereof with recesses 10 which are separated from each other by webs or fins 11 extending in radial direction. The recesses 10 are arranged in the region of torque-transmitting member 3 which is situated between coupling members 1 and 2, and the surfaces of recesses 10 are curved and smooth.

When the flexible coupling is caused to rotate the above webs or fins 11 form impeller vanes, and the torque-transmitting member operates therefore substantially in the fashion of the rotor of a radial blower. The aforementioned recesses 10 and webs or ribs 11 greatly increase the surface of the torque-transmitting member 3, and thus tend to greatly increase heat exchange with the ambient atmosphere. In order to limit the formation of eddies and to establish controlled flows of cooling air coupling member 1 defines a system of angularly displaced air intake passageways 12 and coupling member 2 defines a system of angularly displaced air outlet passages 13.

The structure of FIG. 1 results in cooling of both sides of the flexible torque-transmitting member 3 as indicated in FIG. 1 by arrows representing the general direction of air flow. The number of recesses and ribs can be selected in such a fashion as to maximize cooling action, thus avoiding any dangerous rise in temperature of the flexible torque-transmitting member 3.

Figure 2:
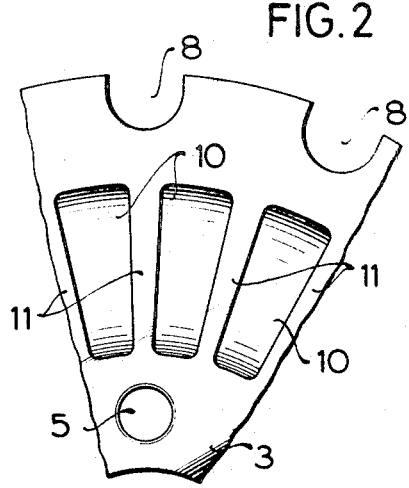
FIG. 2 is a side elevation of the flexible torque-transmitting member of the structure of FIG. 1 seen in the direction of the arrow II of FIG. 1.
Figure 3:
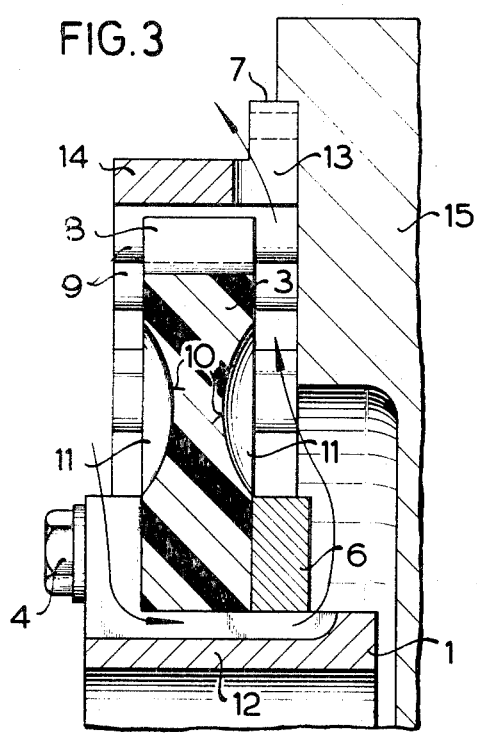
FIG. 3 is a section of the same nature as that shown in FIG. 1 showing a modification of the structure of FIG. 1.

In FIG. 3 the same reference characters as in FIGS. 1 and 2 have been applied to indicate like parts and, therefore, the structure of FIG. 3 calls for a description only to the extent that it differs from the structure of FIGS. 1 and 2. The structure of FIG. 3 is provided with a radially outer coupling member 14 whose axial length is less than that of the corresponding coupling member 2 of FIG. 1. As a result, a flywheel 15 may be arranged relatively close to torque-transmitting member 3. Flywheel 15 operates an air guiding vane, i.e. an air duct or air ducts are established between coupling member 1, torque-transmitting member 3 and coupling member 14, the latter defining air exit passageways 13. This way of controlling the air flow tends to greatly increase the cooling efficiency of the structure of FIG. 3 compared to that of FIG. 1.

Figure 4:
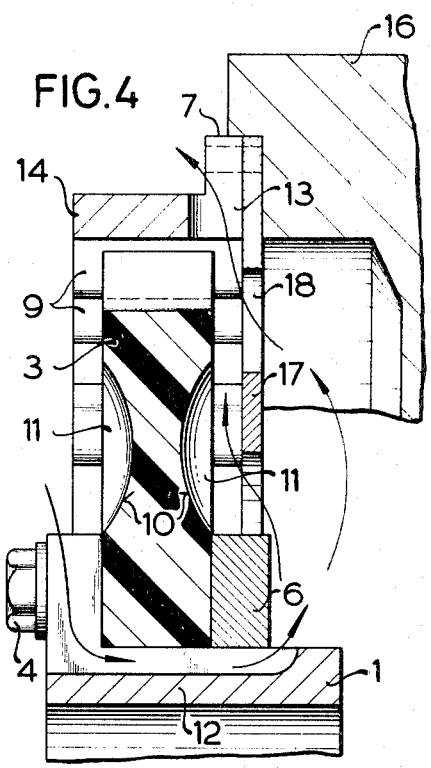
FIG. 4 is a section of the same nature as that shown in FIG. 1 showing another modification of the structure of FIG. 1.

There are instances where it is necessary, or desirable, to achieve the high cooling efficiency of the structure of FIG. 3 without being compelled to arrange a flywheel close to the torque-transmitting member 3 of the flexible coupling. The structure of FIG. 4 is a solution to that particular problem. The structure of FIG. 4 is, in essence, the same as that shown in FIG. 3, but differs from that shown in FIG. 3 by the addition of a perforated baffle plate 17 which is arranged between the flange 7 of coupling member 14 and the flywheel 16 affixed to said flange. Numeral 18 has been applied to indicate perforations in the baffle plate 17 intended for the admission of air to the left side of torque-transmitting member 3. Arrows in FIG. 4 indicate the substantially U-shaped paths of cooling air around torque-transmitting member 3.

FIG. 5 shows substantially the same structure as FIG. 4 with an addition to it. This addition consists in a baffle plate 19 arranged parallel to baffle plate 17 with perforations 18. Plate 19 is arranged on the side of torque-transmitting member 3 opposite to that on which baffle plate 17 is arranged. Baffle plate 19 is substantially in the shape of a ring affixed at the outer periphery thereof to coupling member 14. The structure of FIG. 5 establishes radially outwardly directed air currents to each side of torque-transmitting member 3, as indicated in FIG. 5 by several arrows. Reference character 20 has been applied in FIG. 5 to indicate a system of exit passageways formed between baffle plate 29 and coupling member 14 for the air stream flowing along the left end surface of torque-transmitting member 3.

FIGS. 6-8 illustrate modifications of flexible torque-transmitting members illustrated in the figures previously described. Reference characters 21,22 and 23 have been applied in FIGS. 6-8 to indicate torque-transmitting members provided with baffle plates 24,25 and 26, respectively. The impeller webs or fins 27,28 and 29 have axially outer edges to which the baffle plates 24,25 and 26 are affixed. This may be achieved by means of an appropriate adhesive, if desired, and baffle plates 24,25,26 may be made of the same material as the torque-transmitting members 21,22,23 proper. In FIGS. 6-8 reference character *a* has been applied to indicate an annular intake area formed between baffle plates 24,25,26 and torque-transmitting members 21,22,23 and reference character *b* has been applied to indicate an annular outlet area formed between baffle plates 24,25,26 and torque-transmitting members 21,22,23. The areas *b* should preferably be equal to, or larger than, the areas *a*, but not smaller than the latter.

The torque-transmitting member 23 shown in FIG. 8 is, in essence, the same as that of FIGS. 1-5, 5, but the torque-transmitting members 21,22 of FIGS. 6 and 7 have a significant difference from that of FIGS. 1-5. Their impeller webs or blades 27,28 project beyond the end surfaces of the disc-shaped portion of the torque-transmitting members 21,22, as clearly shown in FIGS. 6 and 7.

The increased width of the impeller webs or impeller blades 27,28 results in an intensified blower action, and consequently in an intensified cooling action.

According to FIG. 6 the portions of baffle plates 24 supported by impeller ribs or impeller blades 27 and juxtaposed to the interblade recesses in torque-transmitting member 21 are parallel, and the cross-sectional area of the passageways formed between the aforementioned ribs or blades, the center portion of the torque-transmitting member 21 and the baffle plates 24 increases from the intake end toward the middle of these passageways, and then decreases toward the exhaust end of these passageways. In the structure of FIG. 7 the radially outer portions of baffle plates 25 converge, as a result of which the cross-sectional area of the passageways defined by parts 22,28 and 25 is more uniform throughout the entire length thereof.

In the structures of FIGS. 9 and 10 one of the coupling members is provided with a flange 32 the other of the coupling members is provided with a flange 33, both flanges 32 and 33 being parallel and defining a gap therebetween. According to FIG. 9 a flexible torque-transmitting member 30 is arranged in the aforementioned gap for transmitting torques from flange 32 to flange 33. Torque-transmitting member 30 is provided on the right side thereof (as seen in FIG. 9) with a system of impeller blades, and the flanges 32 and 33 operate as air flow controlling baffles, thus establishing upon rotation of the coupling an air flow as indicated by the arrows of FIG. 9, i.e. a substantially U-shaped air flow. According to FIG. 10 the torque-transmitting member 31 arranged between the flanges 32,33 is provided with a radial bore, or several such bores 35, and is thus caused to operate as a blower wheel, or blower rotor when the coupling rotates. Air is then sucked in at the gaps formed between flanges 32,33 and member 31 and is ejected radially outwardly through the bore 35, as indicated by arrows in FIG. 10.

The structure of FIG. 11 includes a radially inner annular coupling member 36, a radially outer annular coupling member 37, and a pair of substantially disc-shaped parallel torque-transmitting members 38,39 affixed to members 36 and 37 for transmitting torques from one to the other. The radially inner sides of torque-transmitting members 38,39 are secured to coupling member 36 by means of screw-threaded studs 40 projecting transversely through both torque-transmitting members 38,39 and engaging with the right ends thereof clamping ring means 41. Another clamping ring means 41 is arranged to the left of member 38. The coupling member 36 is provided with a radially inwardly projecting partition 42, and clamping ring means 41 clamp torque transmitting members 38,39 against partition 36 of coupling member 36. Both resilient members 38,39 are provided along the outer periphery thereof with axially extending recesses or grooves 43 engaged by systems of teeth 44 forming integral parts of the radially outer coupling member 37. The latter is further provided with a flange 45 for attachment to a flywheel, or other rotatable machine structure. The juxtaposed surfaces of torque-transmitting members 38,39 are provided with recesses separated by impeller fins or impeller blades 46 and 47, respectively. Torque-transmitting members 38,39 are substantially in the shape of circular discs having end surfaces. The impeller fins or blades 46,47 project from and beyond juxtaposed end surfaces of torque-transmitting members 38,39. The impeller blades 46,47 are arranged in registry and their adjacent axially outer edges are substantially in abutting relation. As a result, the two torque-transmitting members 38,39 and their impeller blades 46,47 form jointly a blower rotor. The coupling member 36 defines intake passageways 48 for the aforementioned blower rotor, and the coupling member 37 defines exhaust passages for the aforementioned blower rotor. As indicated by arrows in FIG. 11 air enters through passageways 48 substantially in axial direction and leaves through passageways 49 substantially in radial direction.

The structure of FIG. 12 is in many respects the same as that shown in FIG. 11 and requires detailed description only to the extent that it differs from that shown in FIG. 11. In the structure of FIG. 12 the radially inner coupling member of relatively small diameter includes two parts 51,52 of which one is a mirror image of the other. Part 51 is provided with slots 48 forming a first air intake, and part 52 is provided with slots 48 forming a second air intake. The impeller blades 46,47 of the two torque-transmitting members 38,39 have juxtaposed edges which are separated from one another by a partition or baffle plate 53. As indicated by the arrows of FIG. 12 air is admitted substantially axially through both intake passageways 48 and flows substantially radially outwardly along both sides of partition 53.

FIG. 13 shows another modification of the dual torque-transmitting member concept of FIG. 11. In this embodiment of the invention the impeller blades 54 and 55 of a pair of disc-shaped torque-transmitting members 56,57 transmitting torques between coupling members 36 and 37 are arranged out of registry and overlap. To be more specific, the impeller blades 54 integral with torque-transmitting member 56 project into the gaps formed by impeller blades 55 integral with torque-transmitting member 57, and vice versa, the impeller blades integral with torque-transmitting member 57 project into the gaps formed by the impeller blades 54 integral with torque-transmitting member 56. In addition to the impeller blades 54,55 provided on the juxtaposed sides of torque-transmitting members 56,57 the latter are provided with impeller blades 58 and 59 on their axially outer sides. These additional impeller blades 58,59 are covered by air guide plates or baffle plates 60, similarly as shown in FIG. 8. In the structure of FIG. 13 three distinct flows of air are established, as indicated in that figure by appropriate arrows. A first current of air enters through the slots 48 in coupling member 36 and flows through the gap formed between torque-transmitting members 56,57 and escapes through the exhaust passageway 49 defined by coupling member 37. Another flow of air enters at the lower edge of left baffle plate 60 and escapes at the upper edge of left baffle plate 60. A third flow of air enters at the lower edge of right baffle plate 60 and escapes at the upper edge of right baffle plate 60 and through passageways 61 defined by the radially outer coupling member 37.

The structures which have been described above operate substantially as radial blowers, i.e. the torque-transmitting members thereof perform the dual function of torque-transmission and of radial blower operation. The torque-transmitting member of the structure of FIG. 14 operates substantially as an axial blower. Referring to FIG. 14, the structure shown therein includes a radially inner coupling member 63, a radially outer coupling member 64 and a flexible torque-transmitting member 62 for transmitting torques from one of the coupling members to the other. Torque-transmitting member 62 is attached to the radially inner coupling member 63 by means of screw-threaded studs 65 projecting through axially extending bores or passageways 66 (FIG.15) in torque-transmitting member 62 and into the clamping ring 67. The radially outer periphery of disc-shaped torque-transmitting member 62 is provided with recesses or axially extending grooves 68 (FIG.15) which are semi-circular in cross-section and are engaged by a system of teeth 69 integral with the radially outer coupling means 64. Numeral 70 has been applied to indicate a flange integral with the radially outer coupling member 64 for securing the latter to a flywheel, or other rotatable structure. The torque-transmitting member 62 is provided with a plurality of angularly displaced bores, or perforations 71 which are separated by radially extending spoke-like ribs 72. The presence of perforations or bores 71 and of spoke-like ribs 72 greatly increases the surface of the torque-transmitting member 62 and consequently its heat exchange characteristics. As shown in FIG.15 the spoke-like ribs formed between contiguous bores or perforations 71 extend straight radially outwardly from the center to the outer circumference of the torque-transmitting member 62. FIG.15 further shows the presence of re-inforcement inserts 74 which are substantially coextensive with the aforementioned spoke-like ribs 72. These re-inforcement inserts may be of a textile material, or of metal. They are preferably surrounding the bores, or apertures 66 for the passage of the screw-threaded studs 65 and may also extend to grooves 68 for reinforcing the walls of the latter. In the structure of FIG.14 the lateral walls of bores or apertures 71 operate as impeller surfaces. Air is admitted substantially axially to bores or apertures 71, and leaves the latter substantially radially, as indicated by arrows in FIG.14.

In the modification of the torque-transmitting member for the structure of FIG.14 which is illustrated in FIG. 16 and also in FIG.17 the torque-transmitting member 75 is substantially disc-shaped and has two parallel end surfaces. The torque-transmitting member 75 has apertures and forms spoke-like ribs 76 between its apertures. These ribs 76 extend strictly radially outwardly, but the apertures have a predetermined slant relative to the end surfaces of the torque-transmitting member 75. In this particular embodiment of the invention the direction of air flow is reversed when the direction of rotation of the flexible coupling and its torque-transmitting member 75 is reversed. This is generally of no moment since generally the cooling action does not depend upon the direction of the flow of cooling air.

As shown in FIGS. 17 and 18 given a sense of rotation of the coupling, the direction of air flow may be controlled by the slant of the spoke-like ribs between contiguous apertures in the torque-transmitting member 75. FIG.17 shows a portion of a torque-transmitting member 75 wherein the walls of the air passageways, or the walls of the inter-passageway spokes 76 are downward slanting from left to right, and FIG. 18 shows a torque-transmitting member 75 wherein the walls of the air passageways or the walls of the inter-passageway spokes 77 are downward slanting from right to left. Where a flexible coupling has but one sense of rotation, and where one direction of the flow of cooling air is preferred, the preferred direction of air flow may be achieved by selecting between the geometry of FIG.17 and that of FIG.18.

The inter-aperture ribs or spokes may be designed in accordance with principles of aerodynamics, or as air-foils, as indicated in FIGS. 19 and 20. The former figure shows a torque-transmitting member 79 for a flexible coupling that has substantially the shape of a conventional blower rotor, and the latter figure shows a torque-transmitting member 81 having inter-passageway spokes 80 which are substantially S-shaped in cross-section, resulting in substantially the same efficiency irrespective of the sense of rotation of the coupling.

The structure shown in FIGS. 21 and 22 is a relatively slight modification of that shown in FIG.14. The radially inner coupling member 63 and the radially outer coupling member 64 are tied together by means of the flexible torque-transmitting member 85. The latter is provided with apertures or perforations 84 having boundary walls 82 and 83 which are inclined relative to the axis of rotation of the coupling, which axis is identical with the axis of annular coupling members 63 and 64. As a result, a radial component is imparted to the flows of air across torque-transmitting member 85. As shown in FIG.22 the direction of the impeller ribs or spokes 86 between contiguous perforations or holes 84 is strictly radial, and the impeller ribs or spokes 86 are straight rather than curved. It is possible to impart a slant and/or curvature to the spokes 68 of FIGS. 21 and 22 as shown in FIGS. 17 to 20 and explained in their context.

The structure of FIGS. 21 and 22 may be referred to, or classified as, a semi-radial blower. All the structures which have been disclosed above are in effect self-cooling ventilators, in addition to being torque-transmitting members for flexible couplings.

It will be apparent from the foregoing that the cooling action inherent in the torque-transmitting members embodying this invention may transcend self-cooling, and be used to cool other adjacent structures.

The circular disc-shaped geometry of the force-transmitting member is preferred, but the invention is not limited to flexible couplings having dis-shaped torque-transmitting members.

We claim as our invention:
1. A flexible coupling including
 a. a first coupling member;
 b. a second coupling member; and c. a flexible torque-transmitting member affixed at one side thereof to said first coupling member and affixed at another side thereof to said second coupling member to transmit torques from said first coupling member to said second coupling member, and said torque-transmitting member including impeller-like surface elements converting rotary motions of said impeller-like surface elements into a flow of ambient air along the surface of said torque-transmitting member in order to cool said torque-transmitting member.

2. A flexible coupling as specified in claim 1 wherein said first coupling member and said second coupling member are substantially in the shape of coaxial rings of different diameter and wherein portions of said torque-transmitting member have a blower-like configuration.

3. A fusible coupling as specified in claim 2 wherein said coaxial rings define air passageways for establishing an air flow directed from the axially inner of said rings along said torque-transmitting member to the axially outer of said rings.

4. A flexible coupling as specified in claim 2 wherein said portions of said torque-transmitting member have the configuration of a radial blower rotor.

5. A flexible coupling as specified in claim 2 wherein said torque-transmitting member is substantially in the shape of a circular disc affixed near the center thereof to the radially inner of said rings and affixed near the outer periphery thereof to the radially outer of said rings, and wherein at least one of the end surfaces of said substantially circular disc is provided with a system of recesses and recess-separating webs arranged to operate as impeller blades.

6. A flexible coupling as specified in claim 5 wherein said recess-separating impeller blade webs project axially outwardly beyond the immediately adjacent end surface of said substantially circular disc.

7. A flexible coupling as specified in claim 5 wherein the axially outer ends of said recess-separating impeller-blade-webs are tied together by an annular air-guiding partition.

8. A flexible coupling as specified in claim 7 wherein said recess-separating impeller-blade-webs and said air-guiding partition define air passageways having at least the same area at the radially outer air outlet ends thereof as at the radially inner air inlet ends thereof.

9. A flexible coupling as specified in claim 2 wherein said rings are tied together by a pair of axially spaced torque-transmitting members having webs projecting from the juxtaposed surfaces thereof and operating as impeller blades.

10. A flexible coupling as specified in claim 9 wherein the juxtaposed edges of said webs of said pair of torque-transmitting members are substantially in abutting relation.

11. A flexible coupling as specified in claim 9 wherein the juxtaposed surfaces of said pair of torque-transmitting members are separated by a partition and wherein the radially inner of said pair of rings defines air-admission passageways arranged to opposite sides of said partition.

12. A flexible coupling as specified in claim 9 wherein said webs of said pair of torque-transmitting members are arranged out of registry and overlap at the juxtaposed ends thereof.

13. A flexible coupling as specified in claim 2 wherein said torque-transmitting member is substantially in the shape of a circular disc having internal radially extending passageways establishing forced flows of air in the direction from the axially inner of said rings to the axially outer of said rings.

14. A flexible coupling as specified in claim 2 wherein said torque-transmitting member is provided with curved radially outwardly extending impeller blades.

15. A flexible coupling as specified in claim 13 wherein said passageways are curved.

16. A flexible coupling as specified in claim 2 wherein said rings are tied together by a torque-transmitting member having substantially the configuration of an axial blower to establish axial flows of ambient air.

17. A flexible coupling as specified in claim 16 wherein said torque-transmitting member includes surface elements imparting to the ambient air a combined axial and radial component.

18. A flexible coupling as specified in claim 15 wherein said torque-transmitting member is substantially in the shape of a circular disc having axial perforations and intermediate webs in the form of the blades of an axial fan.

19. A flexible coupling as specified in claim 18 wherein said intermediate webs are provided with web-reinforcing inserts.

20. A flexible coupling as specified in claim 19 wherein said torque-transmitting member substantially in the shape of a circular disc is provided with axially extending passageways receiving studs affixing said torque-transmitting member to the radially inner of said rings, and wherein said web-reinforcing inserts surround said axially extending passageways.

21. A flexible coupling as specified in claim 18 wherein said webs in the form of the blades of an axial fan are planar and extend axially within a space bounded by a pair of parallel planes at right angles to the common axis of said rings.

22. A flexible coupling as specified in claim 21 wherein said webs in the form of blades of an axial fan are arranged in planes enclosing acute angles with the common axis of said rings.

23. A flexible coupling as specified in claim 18 wherein said webs in the form of blades of an axial fan are curved in blower-blade-like fashion.

24. A flexible coupling as specified in claim 18 wherein said webs in the form of blades of an axial fan are substantially S-shaped in cross-section.

25. A flexible coupling as specified in claim 17 wherein said surface elements are formed by apertures in said torque-transmitting member converging in the direction of the common axis of said pair of rings.

* * * * *